United States Patent Office 3,015,649
Patented Jan. 2, 1962

3,015,649
DICYANDIAMIDE FORMALDEHYDE CONDENSATION PRODUCTS AND THEIR PRODUCTION
Bruno Zorn, Koln-Deutz, and Gustav Mauthe, Opladen, Germany, assignors to Farbenfabriken-Bayer Aktiengesellschaft, a corporation of Germany
No Drawing. Filed Oct. 4, 1957, Ser. No. 688,121
Claims priority, application Germany Apr. 17, 1957
8 Claims. (Cl. 260—69)

This invention relates to condensation products of formaldehyde with mixed dicyandiamide and urea and the process of making such resins.

It is known to prepare dicyandiamide resins of pH value higher than about 7, for use in the treatment of leather, by condensation of dicyandiamide with formaldehyde. These resins can be converted into a form that is soluble in water and stable for sometime in water solution by adding, for example, salts of aromatic sulfonic acids condensed with formaldehyde. The dicyandiamide resin solution so formed can be precipitated from such solutions by acids or acidic metal salts. Since these products are not indefinitely stable in the presence of water, they are stabilized by drying and then redissolved at the time of use. In such cases, however, further uncontrollable condensation frequently occurs. The resins change into insoluble gels in the presence of water, particularly rapidly at elevated temperature.

It has now been found that more stable resins which do not change into the form of a gel in the presence of water but which are precipitable by acid are obtained, even with use of a low proportion of formaldehyde, when a substantial part but not all of the dicyandiamide is replaced by urea. Thus, if 0.5–1.5 mole of formaldehyde are used with 1 mole of mixed dicyandiamide and urea in conjunction with a solubilizing agent such as a surface active salt of a sulfonic acid, the resulting resin, in neutral or alkaline form, is water soluble, stable in aqueous solution, and precipitable by acids at a pH below 7.

If aqueous solutions of the resins obtained according to the invention are heated, then the resins, in contrast to the resins previously known, do not change into gel form, even in the presence of the sulfonates, but become increasingly more soluble in water, while giving off ammonia.

It is known that urea-formaldehyde condensation products of advanced stage of condensation are insoluble in water whereas the dicyandiamide and formaldehyde condensate may be so made as to be soluble in water at the corresponding stage. Now a contrary effect has been found, namely, greater stability of the aqueous solutions of the formaldehyde condensation product when a part of the dicyandiamide in the condensation is replaced by urea.

The effects of using urea in addition to dicyandiamide, in the condensation products of the present invention, are shown by the materials A, B and C made from the compositions tabulated and by the procedure described and tested for stabilities in water solutions with the results that follow.

Compositions and condensation procedure:

|  | A | B | C |
|---|---|---|---|
| Dicyandiamide, moles | 1 | 1 | 1 |
| Urea, moles | | 0.5 | 1 |
| Formaldehyde (37% solution), moles | 1.5 | 1.5 | 2 |
| Sodium salt of dinaphthylmethane disulfonic acid (solubilizer), g | 94 | 94 | 84 |
| Water (additional to formaldehyde solution), g | 250 | 250 | |
| Borax (catalyst), g | 1.8 | | |

A and B condensations are effected by warming for 3 hours at a temperature of 95° C., C for 3 or 10 hours at the same temperature. A, B and C are tested by cooling down a sample. A second sample of each has been tested for stability on storage at 60° C. for a longer period and the remainder has been boiled at a temperature of 100° C. for a longer period.

SOLUBILITY AND STABILITY TESTS (1) After cooling down solutions of A, B and C, A was found not to be homogeneous and no longer to form a clear solution in water, even after further boiling. B, on the other hand, formed a clear solution in cold and hot water, even in great dilution. C (10 hour condensation) was entirely soluble in water above 25° C. C (3 hour condensation) was also entirely soluble in cold water and acid precipitable. Both B and C, however, may be precipitated by diluted mineral acids.

(2) Storage of samples at a temperature of 60° C. had the following results:

| Storage at 60° C. | A | B | C |
|---|---|---|---|
| 1 day | sample not homogeneous, large sedimentation, also not completely soluble in boiling water. | entirely soluble in cold and hot water. | entirely soluble in water above 35° C. |
| 2 days | do | do | entirely soluble in water at 38° C. |
| 3 days | do | do | entirely soluble in water at 39° C. |
| 5 days | do | do | entirely soluble in water at 40° C. |

(3) Storage of samples at a temperature of 100° C. had the following results:

| Storage at 100° C. | A | B | C |
|---|---|---|---|
| 1 hour | partially insoluble, even at boiling temperature; partially soluble at 60°. | entirely soluble in water at 20° C. | entirely soluble in water at 32° C. |
| 5 hours | do | do | entirely soluble in water at 40° C. |
| 10 hours | do | do | entirely soluble in water at 43° C. |
| 12 hours | do | do | entirely soluble in water at 39° C. |

In a modification of the invention, an alcohol is also introduced.

The solubilizing agent required for the conversion into the water soluble condition can be added to the resin prior to the commencement of, during or after the condensation. The agent is anionic. Examples of these solubilizing agents or components are water soluble, substantially neutral or alkaline salts of aromatic or $C_{10}$ or higher aliphatic sulfonic acids and their derivatives, for example, the sodium, potassium, lithium, ammonium, or other alkali metal salt of naphthalene sulfonic acid, dinaphthylmethane disulphonic acid, diisopropyl-naphthalene-sulfonic acid or sulfonic acids condensed with aldehydes, and also naphthol-sulfonic acid, benzene-sulfonic acid, octadecane-, dodecane-, or hexadecane-sulfonic acid, naphthalene-trisulfonic acid, sulphite waste liquor or mixtures of other anionic compounds of this type in the form of their water-soluble salts and particularly any sulfonic acid salt disclosed in U.S. Patent 2,737,504, issued to Dawson and Sellet on March 6, 1956.

The proportion of the sulfonic acid salt required to make the condensation product soluble in water, i.e., non-precipitable on large or infinite dilution, varies somewhat with the sulfonate used. It normally is about 20–100 g. for 1 mole total of dicyandiamide and urea.

In order to lower the reaction velocity, facilitate the solution of the product, and increase the thermal stability of the solution, there are used up to 80% by weight of urea instead of dicyandiamide (i.e. about 5.5 mole urea per mole dicy). When more than 80% of urea are present in the mixture then the products obtained are in fact no longer soluble in water on addition of the solubilizing agent of the above type and they are not precipitable with acids. When less than 0.3 mole of urea is used, long time stability of aqueous solutions of the product is not realized.

The proportion of the formaldehyde used is such as to provide 0.5–1.5 moles for each mole of dicyandiamide and in addition 0.5–1 mole of formaldehyde for each mole of urea.

When the alcohol is used, it decreases the proportion of sulfonate required for a given stability of the resulting water solution below that needed when the alcohol is omitted. The alcohol selected is one that is aliphatic and soluble in water. Examples are methanol, ethanol, isopropanol, t-butanol, glycerol, ethylene glycol, sorbitol, and hexanetriol-1,2,6. These are $C_1$—$C_4$ monohydric alcohols and $C_2$—$C_6$ polyhydric. The alcohols may be used separately or mixed with each other.

The alcohol when present is used in the proportion of about 0.05–1 mole for 1 mole total of dicyandiamide and urea. Best results from the use of the alcohol are obtained with proportions of about 0.2–1 mole of the alcohol for 1 mole of mixed dicyandiamide and urea.

The resins obtained according to the invention can be used in known manner with solubilizing agents, for the treatment of leather, and above all for the final tanning of leather. In addition, however, the resin may be used for impregnating fibrous materials, for example, wood, paper and similar substances.

The process according the invention has the advantage that the required resin solution can be prepared, stored or shipped, and used without an intermediate drying. The resin may, however, be dried and redissolved. Finally, the formaldehyde odor occurring when working with the formerly known resins is almost completely eliminated.

In the following examples, proportions are expressed as parts by weight unless specifically stated to the contrary. The condensation is carried to the stage at which the pH, which is above 7, ceases to rise substantially and becomes practically constant on further heating at the reflux temperature.

Example 1

84 parts of dicyandiamide (1 mole) are mixed with 30 of urea (0.5 mole), 30 of paraformaldehyde (equivalent to 1 mole formaldehyde) and 10 parts of distilled water. While being stirred, the mixture is heated under reflux at 100° C. until a sample of the product is insoluble in water. The pH in such condensation is above 7. A 50% neutral solution oft he sodium salt of dinaphthyl methane disulfonic acid is then added with stirring until 1 part of the syrup is clearly soluble in 10 parts of water at room temperature and the resin separates out in milky form upon addition of a few drops of diluted sulfuric or acetic acid.

The sulphite liquor used in Examples 2 and 3 is alkaline or is mixed with an alkali, such as NaOH or the like in amount to establish the pH above 7. A pH below 7 in the condensation mix containing the sulfonate would lead to the formation of final resin products that are insoluble.

Example 2

84 parts of dicyandiamide, 60 of urea, 45 of paraformaldehyde and 150 of 50% filtered sulphite waste liquor are heated under reflux while stirring, until 1 part of the substance is still just clearly soluble in 10 parts of water at 20° C. Precipitation of the resin takes place slowly on adding diluted acid.

Example 3

84 parts of dicyandiamide, 60 of urea, 55 of paraformaldehyde and 100 of crude delimed 50% sulphite waste liquor are heated under reflux at 90° C., while being stirred, until a sample is clearly soluble in 10% aqueous solution at 20° C. The resin is precipitated on adding a dilute acid in amount to establish the pH below 7.

Example 4

84 parts of dicyandiamide, 120 of urea, 300 of 30% formaldehyde and 100 of the sodium salt of octadecyl sulfonic acid are stirred under reflux at 100° C. until 1 part of the substance is clearly soluble in 10 parts of water at 30° C. and is precipitated on adding dilute acid as stated above.

Example 5

84 parts of dicyandiamide, 30 of urea, 125 of 30% formaldehyde and 75 of the sodium salt of benzene sulfonic acid are stirred under reflux at 96° C., until 1 part of the substance is clearly soluble at 25° C. in 10 parts of water and can be precipitated with acid metal salts such as aluminum sulfate.

Example 6

The procedure indicated in Example 5 is followed with a mixture of 84 parts of dicyandiamide, 30 of urea, 125 of 30% formaldehyde and 70 of naphthalene trisulfonic acid sodium salt.

Example 7

84 parts of dicyandiamide, 60 of urea, 250 of 30% formaldehyde and 84 of the sodium salt of di-n-propyl-naphthalene sulfonic acid are treated as described in Example 5.

Example 8

84 parts of dicyandiamide, 180 of urea, 135 of paraformaldehyde and 100 of the sodium salt of dinaphthylmethane disulfonic acid are treated and examined as described in Example 5.

The modification of the invention in which the condensation, to give the resin, is effected in contact with an alcohol is illustrated in the additional examples that follow.

Example 9

84 parts of dicyandiamide, 60 of urea, 60 of paraformaldehyde, 35 of water, 35 of methanol and 84 of the sodium salt of dinaphthyl-methane disulfonic acid are mixed and heated under reflux at a temperature of about 98° C., until the mixture is clearly soluble in water at 37° C., and there is obtained a precipitation on adding diluted acetic acid (1 N) which takes place in about 10 to 12 hours. The condensation product obtained is more soluble and stable than the comparable condensation product made by using all the other materials except the methanol.

Example 10

84 parts of dicyandiamide, 60 of urea, 60 of paraformaldehyde, 30 of iso-propanol, 35 of water and 70 of the sodium salt of dinaphthyl-methane disulfonic acid are heated for 5 hours at 93° C. The condensation product obtained is clearly soluble in water and yields a strong precipitation on adding 1 N sulfuric acid. The condensation product is more soluble than the corresponding product without iso-propanol.

Example 11

84 parts of dicyandiamide, 30 of urea, 45 of paraformaldehyde, 35 of water, 182 of sorbitol and 60 of the sodium salt of dinaphthyl-methane disulfonic acid are heated to 95° C. as described in Example 10. The clear and water-soluble product obtained is precipitable with acid. It is more readily soluble than the corresponding product made without addition of sorbitol.

It is to be understood that it is intended to cover all changes and modifications of the examples of the in-

What is claimed is:

1. A process for preparing a clear stable solution of a dicyandiamide urea and formaldehyde condensation product, which comprises heating at a reaction temperature an aqueous solution having a pH of above 7 of dicyandiamide, urea and formaldehyde to the stage wherein the resinous product from these three ingredients is water-insoluble, the proportions of the reactants being from about 0.3 to about 5.5 moles of urea per mole of dicyandiamide, from about 0.5 to about 1.5 moles of formaldehyde per mole of dicyandiamide, and from about 0.5 to about 1 mole of formaldehyde per mole of urea; adding to the said water-insoluble resinous product a water-soluble alkali metal salt of a sulfonic acid selected from the group consisting of aliphatic sulfonic acids containing at least ten carbon atoms in the alkyl group thereof and aromatic sulfonic acids to form a clear aqueous solution thereof.

2. The clear aqueous solution prepared in accordance with the process of claim 1.

3. The process of claim 1 which comprises including a water-soluble alkanol with the dicyandiamide, urea and formaldehyde in forming the water-insoluble resinous product, the proportion of the alkanol being from about 0.05 to about 1 mole per mole total of the dicyandiamide and urea.

4. The clear aqueous solution prepared in accordance with the process of claim 3.

5. A process for preparing a clear stable solution of a dicyandiamide urea and formaldehyde condensation product, which comprises heating at a reaction temperature an aqueous solution having a pH of above 7 of dicyandiamide, urea, formaldehyde, and a water-soluble alkali metal salt of a sulfonic acid selected from the group consisting of aliphatic sulfonic acids containing at least ten carbon atoms in the alkyl group thereof and aromatic sulfonic acids, the proportions of the materials being from about 0.3 to about 5.5 moles of urea per mole of dicyandiamide, from about 0.5 to about 1.5 moles of formaldehyde per mole of dicyandiamide, and from about 0.5 to about 1 mole of formaldehyde per mole of urea; the reaction conditions being such that the dicyandiamide, urea and formaldehyde would form a water-insoluble resinous product in the absence of the water-soluble alkali metal salt of sulfonic acid, and with the sulfonic acid salt to form a clear aqueous solution of such water-insoluble condensation products.

6. The clear aqueous solution prepared in accordance with the process of claim 5.

7. The process of claim 5 which comprises including a water-soluble alkanol with the dicyandiamide, urea, and formaldehyde in forming the water-insoluble reaction product, the proportion of the alkanol being from about 0.05 to about 1 mole per mole total of the dicyandiamide and urea.

8. The clear aqueous solution prepared in accordance with the process of claim 7.

References Cited in the file of this patent

UNITED STATES PATENTS

| | | |
|---|---|---|
| 1,812,374 | Ripper | June 30, 1931 |
| 2,060,122 | Ripper et al. | Nov. 10, 1936 |
| 2,423,185 | Gundel et al. | July 1, 1947 |
| 2,662,071 | Elod | Dec. 8, 1953 |
| 2,662,868 | Kaess et al. | Dec. 15, 1953 |
| 2,690,434 | Sellet et al. | Sept. 28, 1954 |
| 2,737,504 | Dawson et al. | Mar. 6, 1956 |
| 2,829,126 | Suen et al. | Apr. 1, 1958 |
| 2,884,403 | Zorn et al. | Apr. 28, 1959 |

FOREIGN PATENTS

| | | |
|---|---|---|
| 1,013,763 | France | Aug. 4, 1952 |